(12) United States Patent
Mori et al.

(10) Patent No.: US 9,557,962 B2
(45) Date of Patent: Jan. 31, 2017

(54) VOICE CONTROL DEVICE, VOICE CONTROL METHOD AND PROGRAM

(71) Applicant: Sony Corporation, Tokyo (JP)

(72) Inventors: Maki Mori, Tokyo (JP); Shunichi Kasahara, Kanagawa (JP); Osamu Shigeta, Tokyo (JP); Seiji Suzuki, Kanagawa (JP); Ryo Fukazawa, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/046,578

(22) Filed: Feb. 18, 2016

(65) Prior Publication Data

US 2016/0210118 A1 Jul. 21, 2016

Related U.S. Application Data

(63) Continuation of application No. 14/353,856, filed as application No. PCT/JP2012/005291 on Aug. 23, 2012, now Pat. No. 9,299,349.

(30) Foreign Application Priority Data

Nov. 9, 2011 (JP) .................................. 2011-245357

(51) Int. Cl.
*G10L 21/00* (2013.01)
*G06F 3/16* (2006.01)
(Continued)

(52) U.S. Cl.
CPC ............. *G06F 3/167* (2013.01); *G06F 3/0488* (2013.01); *G06F 17/30752* (2013.01);
(Continued)

(58) Field of Classification Search
CPC ........ G10L 13/033; G10L 13/08; G10L 15/22; G10L 15/26; G10L 17/00; G10L 15/30
(Continued)

(56) References Cited

U.S. PATENT DOCUMENTS 7,031,924 B2 4/2006 Kimura et al.
8,736,636 B2 * 5/2014 Kang ................ G06F 17/30241
345/629

(Continued)

FOREIGN PATENT DOCUMENTS

EP 2214425 A1 8/2010
JP 63-260253 A 10/1988
(Continued)

OTHER PUBLICATIONS

Japanese Office Action for Patent No. 2011245357 Dated Apr. 12, 2016.
(Continued)

*Primary Examiner* — Charlotte M Baker
(74) *Attorney, Agent, or Firm* — Lerner, David, Littenberg, Krumholz & Mentlik, LLP

(57) ABSTRACT

According to an illustrative embodiment, an information processing apparatus is provided. The information processing apparatus includes a communication device to receive plural pieces of tag information corresponding to respective positions within a target area, the target area having a position defined by the position of the apparatus; and an output device to output a plurality of sounds such that for each sound at least a portion of the sound overlaps with at least a portion of another of the sounds, each of the sounds being indicative of a respective piece of tag information.

18 Claims, 14 Drawing Sheets

(51) Int. Cl.
    *H04S 7/00*      (2006.01)
    *G10L 17/00*     (2013.01)
    *G06F 3/0488*    (2013.01)
    *G06F 17/30*     (2006.01)
    *G06T 11/60*     (2006.01)
    *G10L 13/04*     (2013.01)
    *G10L 25/48*     (2013.01)

(52) U.S. Cl.
    CPC ............ *G06T 11/60* (2013.01); *G10L 13/043* (2013.01); *G10L 17/00* (2013.01); *G10L 25/48* (2013.01); *H04S 7/302* (2013.01); *H04R 2430/01* (2013.01); *H04R 2460/07* (2013.01); *H04S 2400/11* (2013.01); *H04S 2400/13* (2013.01)

(58) Field of Classification Search
    USPC ........ 704/270, 275; 345/629, 630, 631, 632, 345/633; 455/446, 447, 448, 449
    See application file for complete search history.

(56) References Cited

U.S. PATENT DOCUMENTS

| | | |
|---|---|---|
| 2002/0019736 A1 | 2/2002 | Kimura et al. |
| 2006/0143012 A1 | 6/2006 | Kimura et al. |
| 2009/0315775 A1 | 12/2009 | Khosravy et al. |

FOREIGN PATENT DOCUMENTS

| | | |
|---|---|---|
| JP | H0566131 B2 | 9/1993 |
| JP | 2002-023778 A | 1/2002 |
| JP | 2010-049158 A | 3/2010 |
| JP | 2010-103756 A | 5/2010 |
| JP | 2011197477 A | 10/2011 |
| WO | 0155833 A1 | 8/2001 |
| WO | 2009128859 | 10/2009 |

OTHER PUBLICATIONS

Extended European Search Report for EP Application No. 12848137.1, dated Aug. 10, 2015.

China Office Action for Patent No. 201280053462.9 Dated Mar. 4, 2016.

* cited by examiner

● ・・・TAG INFORMATION

● ・・・TAG INFORMATION

Fig. 12
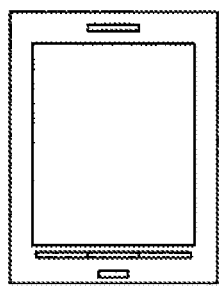  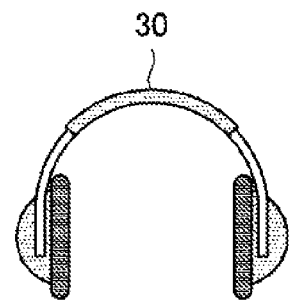

VOICE CONTROL DEVICE, VOICE CONTROL METHOD AND PROGRAM

CROSS-REFERENCE TO RELATED APPLICATION

The present application is a continuation application of U.S. application Ser. No. 14/353,856, filed Apr. 24, 2014, which is a national phase entry under 35 U.S.C. §371 of International Application No. PCT/JP2012/005291 filed Aug. 23, 2012, published on May 16, 2013 as WO 2013/069178 A1, which claims priority from Japanese Patent Application No. JP 2011-245357 filed in the Japanese Patent Office on Nov. 9, 2011.

TECHNICAL FIELD

The present disclosure relates to voice control devices, voice control methods and programs.

BACKGROUND ART

In these days, applications employing AR (augmented reality) technology come under the spotlight accompanying the popularization of mobile terminals equipped with an imaging device and a display. For example, as an application employing the AR technology, an AR application which adds tag information like a picture, a text or a voice to a picture image of an actual space based on the position of the mobile equipment.

An AR application allows a user to view and operate a piece of tag information added to the actual space. However, as the number of tags of information added to the actual space increases, since the visibility of the screen decreases, it is difficult for the user to find a desired piece of information. With respect to this problem, JP-A-2010-49158 discloses a voice control device which guides a user with voice in accordance with the relationship between the mobile terminal and an object position.

SUMMARY

Technical Problem

However, in the case when plural pieces of tag information, which are associated with an area surrounding the mobile terminal, are output in series with voice, as the number of tags of information increases, it takes a considerably long time to output user's favorite tag information. It is not easy for the user to extract a piece of desired tag information.

The present disclosure proposes a novel and improved voice control device, a voice control method and a program which enables a swift extraction of a piece of information to be output with voice from plural pieces of information.

Solution to Problem

According to an illustrative embodiment, an information processing apparatus is provided. The information processing apparatus includes a communication device to receive plural pieces of tag information corresponding to respective positions within a target area, the target area having a position defined by the position of the apparatus; and an output device to output a plurality of sounds such that for each sound at least a portion of the sound overlaps with at least a portion of another of the sounds, each of the sounds being indicative of a respective piece of tag information.

Advantageous Effects of Invention

As described above, the present disclosure makes it possible to swiftly extract a piece of information to be output with voice from plural pieces of information.

BRIEF DESCRIPTION OF DRAWINGS

FIG. 12 illustrates a mobile terminal and a voice output unit according to a second embodiment of the present disclosure;

DESCRIPTION OF EMBODIMENTS

Figure 1:
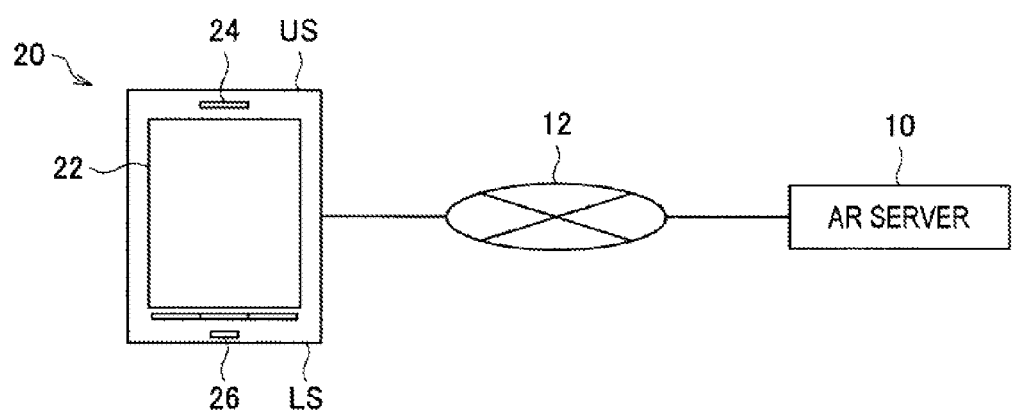
FIG. 1 illustrates a configuration of a voice control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present disclosure will be described in detail below while referring to appended drawings. In this specification and drawings, composing elements which have substantially identical structure and function will be given with identical reference numeral to thereby avoid duplicated explanation.

Also, in the specification and drawings, a plurality of composing elements which have substantially identical structure and function may be discriminated from each other by appending different alphabet behind the identical reference numeral. However, when a plurality of composing elements which have substantially identical structure and function may not be discriminated from each other, only identical reference numeral will be given.

Description of the present disclosure will be made in the following order.
1. Basic configuration of voice control system
2. First Embodiment
2-1. Outline of the first embodiment
2-2. Configuration of mobile terminal according to the first embodiment
2-3. Operation of mobile terminal according to the first embodiment
3. Second Embodiment
4. Hardware configuration of the mobile terminal
5. Conclusion

1. Basic Configuration of Voice Control System

The technology described in the present disclosure may be implemented in a various modes as will be described in detail in "2. First embodiment" to "3. Second embodiment" as examples. Voice control device (mobile terminal 20) according to the embodiment includes:
A. an information obtaining section (a communication section 228 and an information analysis section 236) that obtains a piece of information which is associated with a position in a surrounding area; and
B. a voice control section (240) that performs voice control so that, when plural pieces of information are obtained by the information obtaining section, the plural pieces of information are output at a time.

First of all, a basic configuration of a voice control system which is common to the embodiments will be described referring to FIG. 1.

FIG. 1 illustrates a configuration of a voice control system according to an embodiment of the present disclosure. The voice control system according to the embodiment of the present disclosure includes an AR server 10 and a mobile terminal 20 as shown in FIG. 1.

The AR server 10 and the mobile terminal 20 are connected to each other via a communication network 12 and are capable of communicating various kinds of information therebetween via the communication network 12. The communication network 12 is a wired or wireless transmission channel of information transmitted from apparatuses connected to the communication network 12. For example, the communication network 12 may include a public network such as Internet, telephone network, satellite communication network or various kinds of LANs (local area network), WAN (wide area network) including Ethernet (registered trademark). Also, the communication network 12 may include a leased line network such as IP-VPN (Internet protocol-virtual private network).

The AR server 10 stores positional information and tag information while associating with each other, and transmits the positional information and the tag information to the mobile terminal 20 via the communication network 12. For example, receiving from the mobile terminal 20 a piece of positional information which represents a present position of the mobile terminal 20, the AR server 10 transmits to the mobile terminal 20 a piece of positional information and tag information which represent the location around the mobile terminal 20. Also, receiving from the mobile terminal 20 a piece of directional information which represents a direction in which a particular portion of the mobile terminal 20 is oriented, the AR server 10 may transmit to the mobile terminal 20 a piece of positional information and tag information representing a positional direction represented by the directional information viewed from the present position of the mobile terminal 20.

As for the tag information, image information such as picture or motion picture, text information and voice information are conceivable, for example. The tag information may be a piece of PR information on a location represented by the associated positional information or a piece of information which is provided and uploaded by an ordinary user with respect to the location represented by the associated positional information.

The mobile terminal 20 obtains a piece of positional information and tag information with respect to the surrounding area of the present position, and provides the tag information to the user. For example, the mobile terminal 20 transmits to the AR server 10 a piece of positional information representing the present position to the AR server 10 to obtain a piece of tag information and positional information with respect to the surrounding area of the present position from the AR server 10. And the mobile terminal 20 may add a piece of tag information to a picture image of the actual space and displays the same on the touch panel 22.

The mobile terminal 20 includes a speaker 24 as an example of a voice output section for outputting voices; and a microphone 26 as an example of a voice input section for picking up voices. In this specification, in the mobile terminal 20, the end where the speaker 24 is disposed will be referred to as upper side US; and the end where the microphone 26 is disposed will be referred to as lower side LS.

FIG. 1 shows a smartphone as an example of the mobile terminal 20. However, the mobile terminal 20 is not limited to the smartphone. For example, the mobile terminal 20 may be a PDA (personal digital assistants), a mobile phone, a mobile music reproducer, a mobile image processor, or a mobile game machine.

Background of the Embodiment

Figure 2:
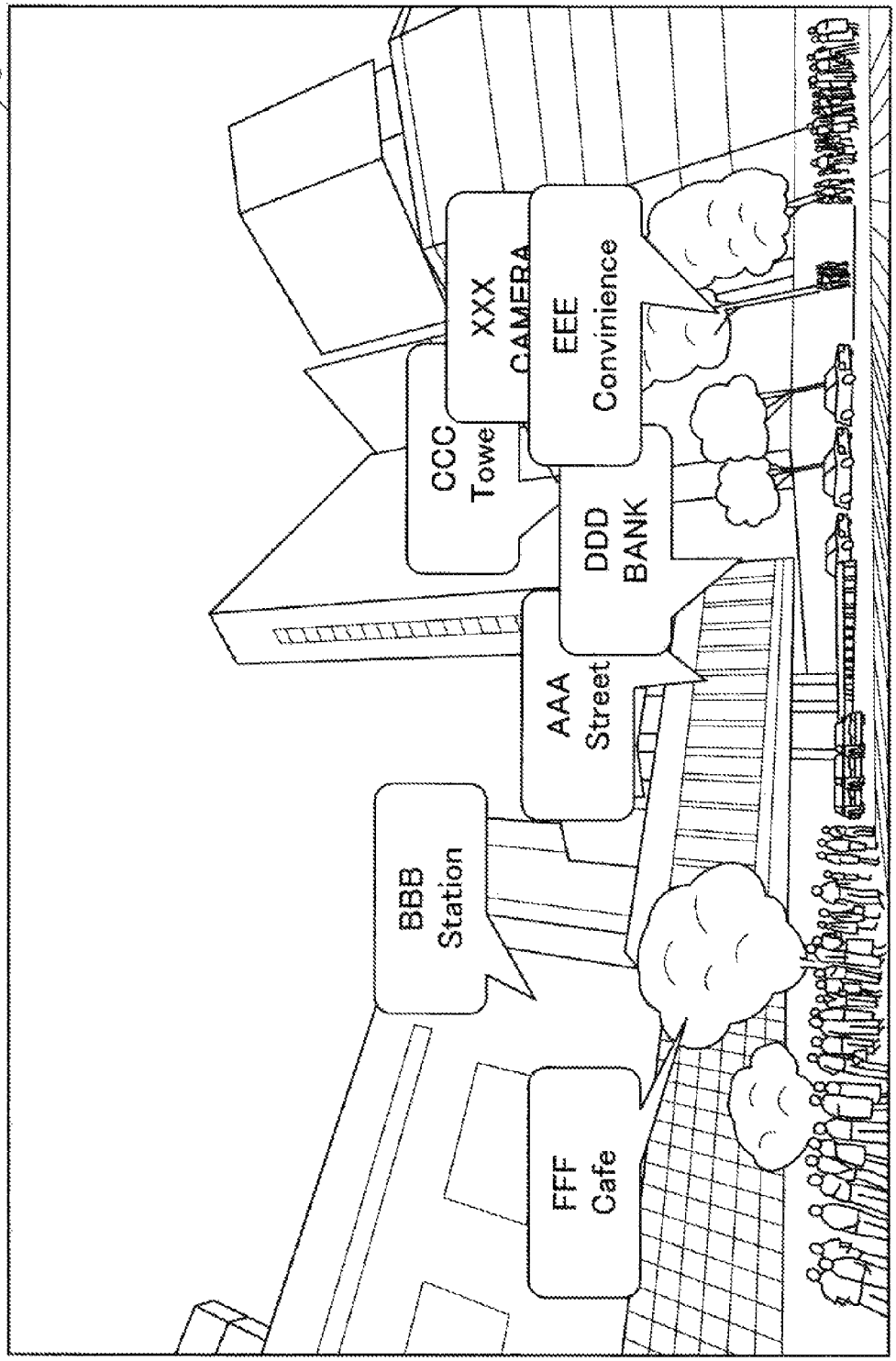
FIG. 2 illustrates a picture image of an actual space in which tag information is added.

Accompanying the popularization of mobile terminals such as smartphone, applications, which add tag information such as picture, text and/or voice to a picture image of an actual space as described above, are getting much attention. Using such application, for example, a picture image of an actual space, to which plural pieces of tag information are added as shown in FIG. 2, is displayed. Therefore, the user is allowed to view and operate the plural pieces of tag information which are hardly obtained from the actual space.

However, when the number of the pieces of tag information which are added to the actual space increases, since the visibility of the screen decreases, it is difficult for the user to find desired information. It is conceivable to output tag information with voices. In the case the plural pieces of tag information associated with area surrounding the mobile terminal are output with voices in series, as the number of tags of information increases, since it takes a considerably long time to output a piece of tag information which the user is interested in, it is not easy for the user to extract the desired tag information.

Under such circumstances as described above, the embodiment of the present disclosure has been proposed. The embodiment enables a swift extraction of information from plural pieces of tag information which are output with voices. A detailed description will be made below on a first embodiment and a second embodiment of the present disclosure which provide such effect.

2. First Embodiment

2-1. Outline of the First Embodiment

Figure 3:
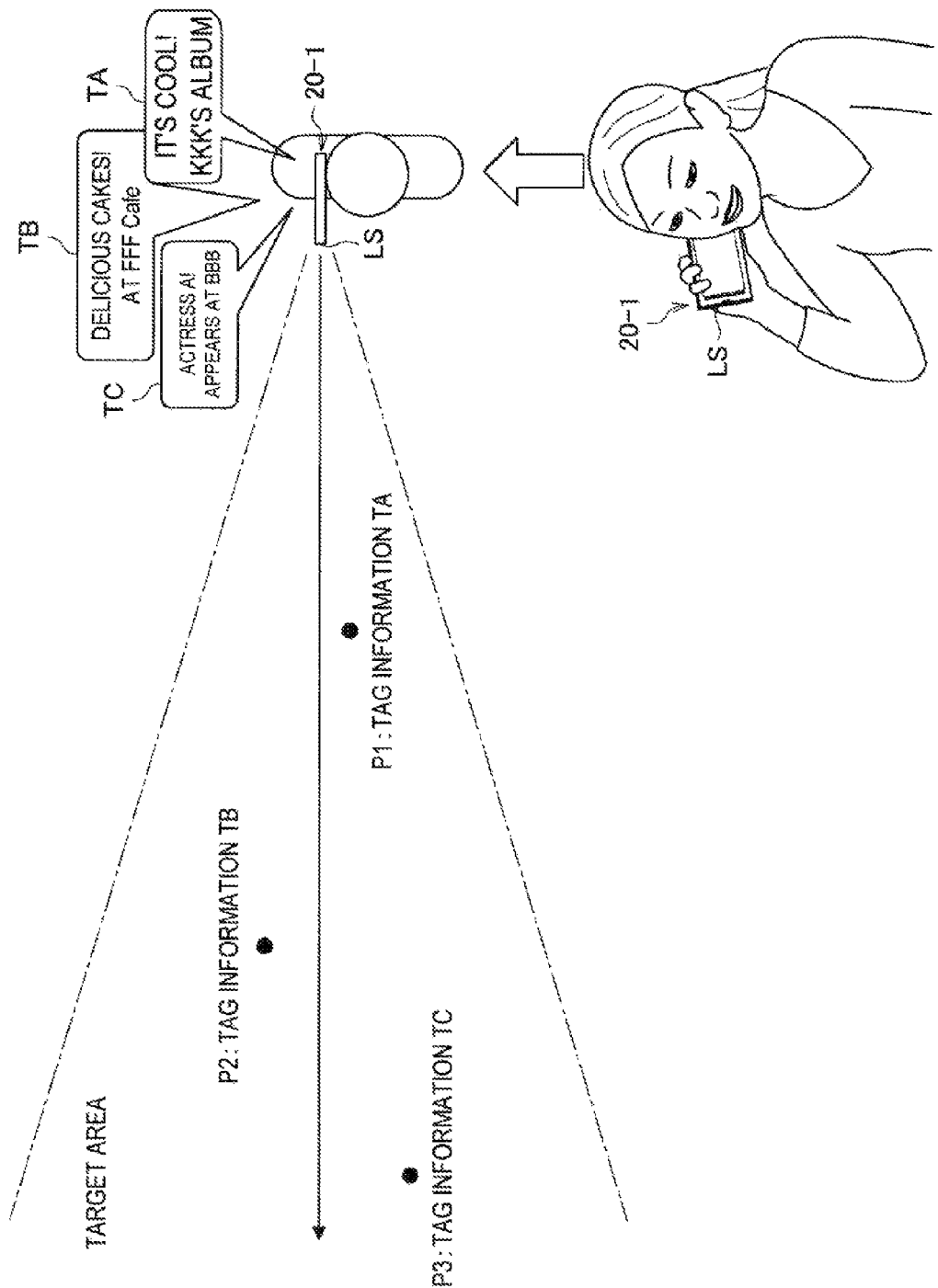
FIG. 3 illustrates a specific example of utilization mode of a mobile terminal according to a first embodiment.

It is known the fact that, even under circumstances filled with various kinds of noises, a person is able to unintentionally recognize words and conversation which he/she is interested in (cocktail-party effect). A mobile terminal 20-1 according to the first embodiment of the present disclosure utilizes the cocktail-party effect. When the user is provided with the tag information output with voices, the user can swiftly extract the favorite tag information. Referring to FIG. 3, a specific example of a utilization mode of the mobile terminal 20-1 according to the first embodiment will be described below.

FIG. 3 illustrates a specific example of utilization mode of the mobile terminal 20-1 according to the first embodiment. When the user holds the speaker 24 of the mobile terminal 20-1 over his/her ear as shown in FIG. 3, the mobile terminal 20-1 simultaneously performs voice output of plural pieces of tag information associated with a position in a surrounding area. In particular, the mobile terminal 20-1 sets an target area including a direction in which the lower side LS as a particular portion of the mobile terminal 20-1 is oriented as a reference, and outputs simultaneously plural pieces of tag information TA to TC which are associated with positions P1 to P3 in the target area. That is, the mobile terminal 20-1 simultaneously a performs voice output of piece of tag information TA "It's cool! KKK's album." a piece of tag information TB "Delicious cakes! at FFF Cafe.", a piece of tag information TC "Actress A appears at BBB!".

With this, when the user is interested in actress A for example, he/she swiftly listen to the tag information relevant to the actress A base on the cocktail-party effect, and knows that the actress A appears in a direction the lower side LS of the mobile terminal 20-1 is oriented. The mobile terminal 20-1 may outputs the tag information with a smaller volume level as the distance between the position associated with the tag information and the present position increases. In this case, the user can sense the distance between the position associated with the piece of desired tag information and the present position.

2-2. Configuration of the Mobile Terminal the First Embodiment

Outline of the first embodiment of the present disclosure has been described above. Subsequently, configuration of the mobile terminal 20-1 according to the first embodiment of the present disclosure will be described in detail.

Figure 4:
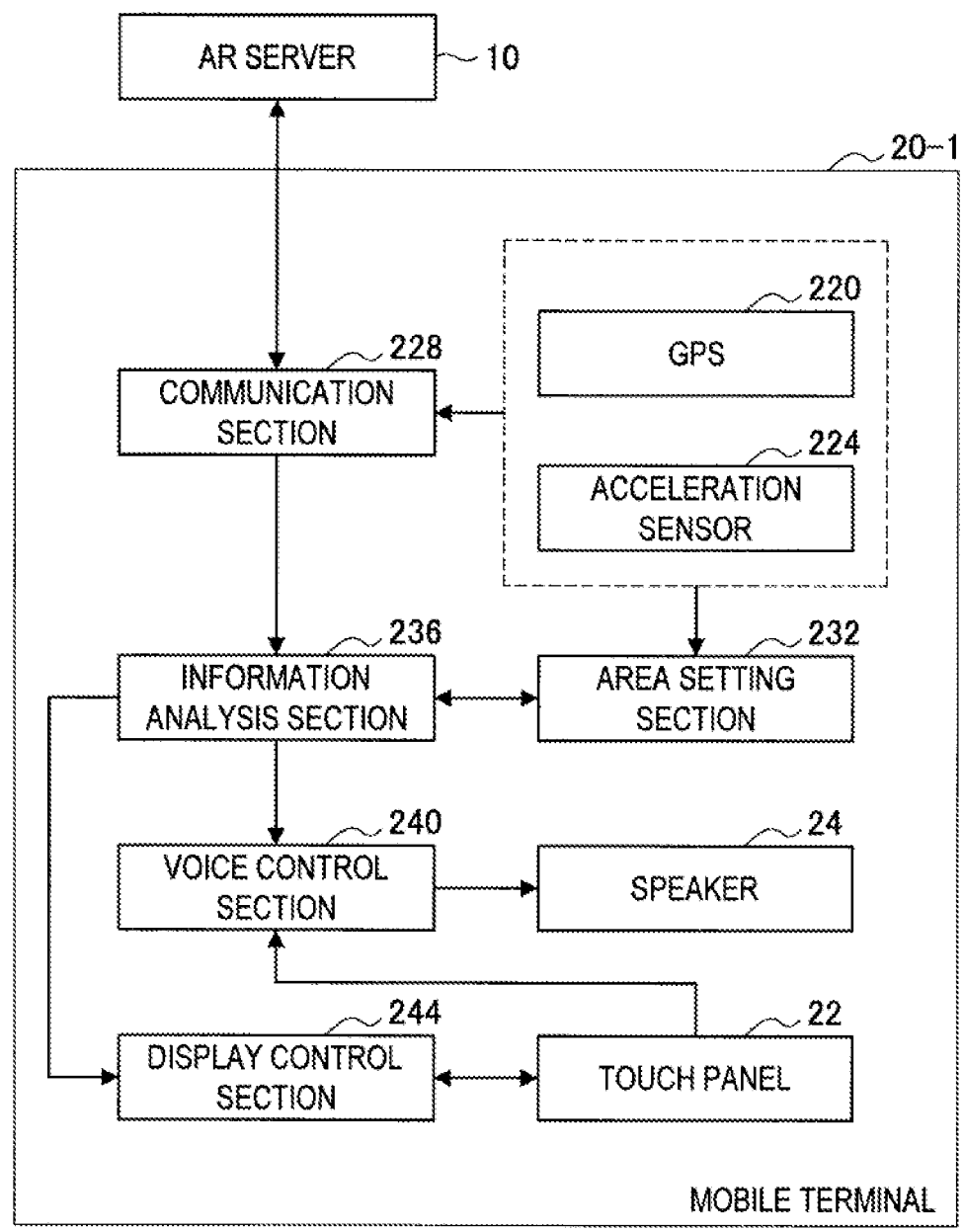
FIG. 4 is a functional block diagram illustrating a configuration of a mobile terminal according to the first embodiment of the present disclosure.

FIG. 4 is a functional block diagram showing a configuration of the mobile terminal 20-1 according to the first embodiment of the present disclosure. As shown in FIG. 4, the mobile terminal 20-1 according to the first embodiment of the present disclosure includes the touch panel 22, the speaker 24, a GPS 220, an acceleration sensor 224, the communication section 228, an area setting section 232, the information analysis section 236, a voice control section 240 and a display control section 244. The mobile terminal 20-1 may include a direction sensor (not shown), such as an electronic compass. The direction sensor may be included in addition to the acceleration sensor 224, or as an alternative to the acceleration sensor 224.

GPS

The GPS (global positioning system) 220 receives a navigation message which is transmitted from an artificial satellite to obtain a present position of the mobile terminal 20-1 based on the reception result of the navigation message. The GPS 220 is given here just an example of a component for obtaining the present position of the mobile terminal 20-1. The present position of the mobile terminal 20-1 may be obtained by other configuration. For example, the mobile terminal 20-1 may estimate the present position based on the intensity of received Wi-Fi radiowaves which are transmitted from surroundings wireless communication devices, or the present position may be obtained based on the input operation made by the user.

Acceleration Sensor

The acceleration sensor 224 measures the acceleration of the mobile terminal 20-1. Based on the measurement result by the acceleration sensor 224, the orientation of the mobile terminal 20-1; for example, a direction the lower side LS of the mobile terminal 20-1 is oriented can be estimated.

Communication Section

The communication section 228 is an interface with the AR server 10 that exchanges various kinds of information with the AR server 10. For example, the communication section 228 transmits a piece of positional information of the mobile terminal 20-1 obtained by the GPS 220 to the AR server 10, and receives a piece of tag information associated with area surrounding the mobile terminal 20-1 from the AR server 10 along with the positional information. Also, in addition to the positional information of the mobile terminal 20-1, the communication section 228 may transmit a measurement result made by the acceleration sensor 224, the direction sensor, or both the acceleration sensor 224 and the direction sensor to the AR server 10. In this case, a piece of tag information, which is associated with a location in a direction the lower side LS of the mobile terminal 20-1 is oriented, can be received from the AR server 10. Thus, the communication section 228 or the information analysis section 236, which will be described later, functions as an information obtaining section for obtaining the tag information for outputting voice information.

In this embodiment, an example is given, in which the mobile terminal 20-1 obtains the tag information from the AR server 10. However, the embodiment is not limited to the above. For example, the mobile terminal 20-1 may have a database in which the positional information and the tag information are associated with each other, and may obtain the tag information associated with the area surrounding the mobile terminal 20-1 from the database.

Area Setting Section

The area setting section 232 sets an target area relevant to the voice output of the tag information based on the positional information of the mobile terminal 20-1 supplied from the GPS 220 and the measured result obtained by the acceleration sensor 224, the direction sensor, or both the acceleration sensor 224 and the direction sensor. The object of the voice output is the tag information that is associated with the positional information within the target area set by the area setting section 232. Here, referring to FIG. 5, a particular description is made below on the target area set by the area setting section 232.

Figure 5:
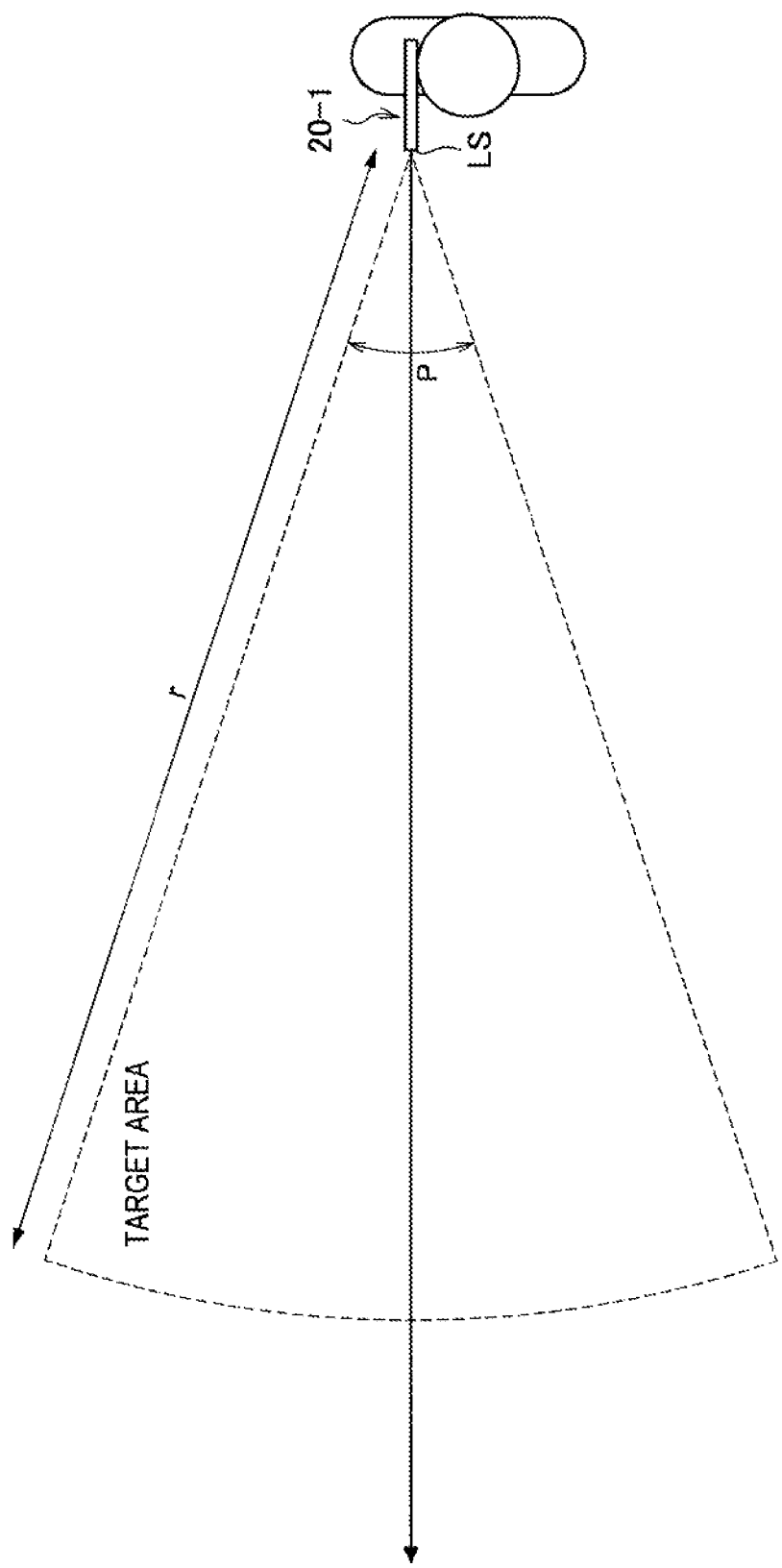
FIG. 5 illustrates a specific example of a target area which is set through an area setting section.

FIG. 5 illustrates an example of a specific target area that is set by the area setting section 232. The area setting section 232 may set as a target area, for an example, a sector area which is represented by a radius "r" and an angle "P" with respect to a direction the lower side LS of the mobile terminal 20-1 is oriented as a reference.

Here, if too many pieces of tag information, which are simultaneously output in a form of sound, are included within the target area, the cocktail-party effect may decrease causing it difficult for the user to apprehend the favorite tag information. Contrarily, if the number of pieces of tag information which are simultaneously output in a form of sound is too small, the possibility of outputting user's favorite tag information also decreases. Therefore, the efficiency of information extraction decreases.

Figure 6:
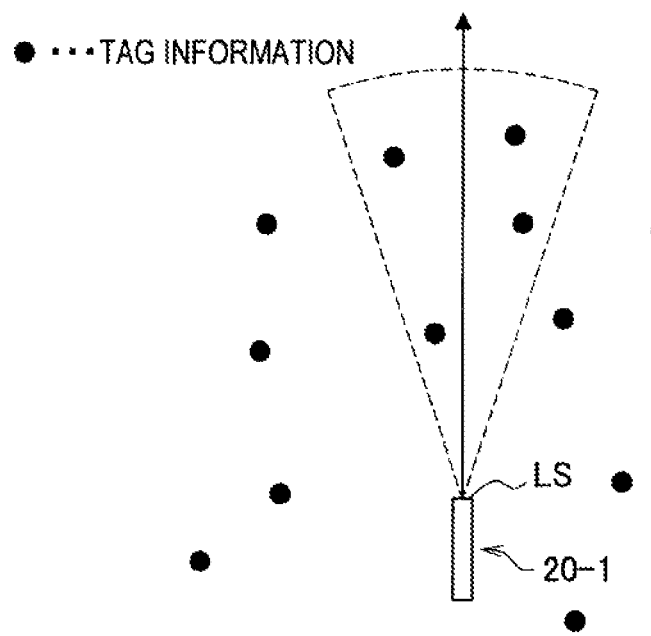
FIG. 6 illustrates a specific example of a target area in a case when the density of tag information around the mobile terminal is high.
Figure 7:
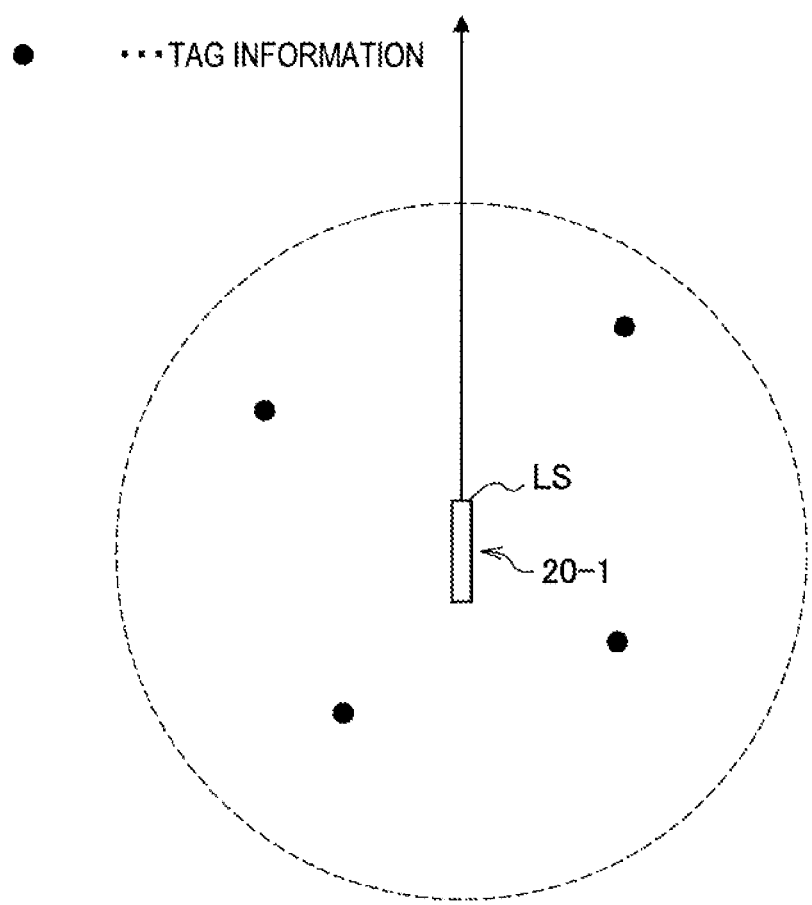
FIG. 7 illustrates a specific example of a target area in a case when the density of tag information around the mobile terminal is low.

Therefore, the area setting section 232 may change the range of the target area in accordance with the density of plural pieces of tag information within the area. For example, the area setting section 232 may set the target area so that the number of pieces of tag information, which are associated with the positional information within the target area, is larger than a lower limit value, smaller than an upper limit value, or equal to a predetermined number. Referring to FIG. 6 and FIG. 7, a particular description will be made on this point.

FIG. 6 illustrates a specific example of the target area in which the density of plural pieces of tag information in area surrounding the mobile terminal 20-1 is too high. While FIG. 7 illustrates a specific example of the target area in which the density of plural pieces of tag information in the area surrounding the mobile terminal 20-1 is too low. When the density of the tag information in the surrounding area is too high as shown in FIG. 6, the area setting section 232 may set the target area to be narrower by reducing the radius "r" and the angle "P". Contrarily, when the density of the tag information in the surrounding area is too low as shown in FIG. 7, the area setting section 232 may set the target area to be wider by increasing the radius "r" and the angle "P".

By configuring the area setting section 232 as described above, it is possible to enhance the level of comprehension of tag information for the user and to ensure the efficiency of the information extraction.

Information Analysis Section

The information analysis section 236 extracts several pieces of tag information, each associated with a piece of positional information within the target area set by the area setting section 232, from plural pieces of tag information within the surrounding area received by the communication section 228. Also, the information analysis section 236 analyzes each position associated with the extracted tag information and the distance from the mobile terminal 20-1 and the angle, and supplies the analyzed result to the voice control section 240.

Voice Control Section

The voice control section 240 controls the voice output from the speaker 24 of the tag information extracted by the information analysis section 236. In particular, the voice control section 240 performs voice control so that the tag information extracted by the information analysis section 236 is simultaneously output from the speaker 24 (first control mode). With this configuration, it is made possible for the user to efficiently apprehend his/her favorite tag information from plural pieces of tag information which are output simultaneously base on the cocktail-party effect. Also, the voice control section 240 may perform the following controls; i.e., example A to example E when outputting the voice tag information.

Control Example A

The voice control section 240 may control the volume level of the tag information in accordance with the distance between the mobile terminal 20-1 and the position associated with the tag information. For example, the voice control section 240 may control so that the volume level of the tag information becomes smaller as the distance between the mobile terminal 20-1 and the position associated with the tag information increases. This configuration makes it possible for the user to apprehend a sense of distance between the present position and the position associated with the tag information.

Control Example B

The voice control section 240 may perform the voice control so that each of plural pieces of tag information is output with sound characteristics different from each other. For example, the voice control section 240 may perform the voice control so that each of the plural pieces of tag information are output with a basic frequency or sound quality different from each other. This configuration ensures the cocktail-party effect to function more effectively.

Control Example C

When the tag information is other than voice information, the voice control section 240 may generate a piece of voice information from the tag information. For example, when the tag information is a piece of text information, the voice control section 240 may generate a piece of voice information corresponding to the text information. Also, when the tag information is a picture tag, the voice control section 240 may generate a piece of voice information corresponding to a comment added to the picture tag. This configuration enables the voice control section 240 to handle many pieces of tag information as the object of voice output.

Control Example D

Figure 8:
FIG. 8 illustrates rearranged tag information.

The voice control section 240 may extract keywords from the respective pieces of tag information and perform the voice control so as to disperse timing of outputting keyword of the tag information. For example, it is assumed that the keyword of the tag information TA: "IV s cool! KKK's album" is "KKK"; the keyword of the tag information TB: "Delicious cakes! At FFF Cafe." is "FFF Cafe"; and the keyword of the tag information TC: "Actress A appears at BBB!" is "actress A". In this case, when these pieces of tag information are output as they are, the keyword "KKK" of the tag information TA and the keyword "FFF Cafe" of the tag information TB are output simultaneously. In this case, the voice control section 240 may rearrange the content of the tag information TB as shown in FIG. 8 so that the keyword "KKK" of the tag information TA is output at a different timing from that of the keyword "FFF Cafe" of the tag information TB. This configuration enables the keywords of the tag information to be apprehended more easily.

Control Example E

The voice control section 240 may rearrange the content of the tag information based on the user's preference so that user's favorite word is output first. In the case, when the user is interested in, for example, "actress A", the voice control section 240 may rearrange the content of the tag information TC like this; "Actress A! appears at BBB" so that "Actress A" is output first. This configuration enables the user to extract his/her favorite tag information at an earlier timing.

The voice control section 240 switches the voice control to a second mode, in which plural pieces of tag information extracted by the information analysis section 236 are output in series based on a predetermined user operation such as tapping. In this mode, the user is allowed to select a desired piece of tag information by performing a first user operation while the desired tag information is being output with voice. The voice control section 240 may switch the tag information of an object to be output with voice responding to a second user operation like flicking. A particular description will be made on a series of such operation below referring to FIG. 9.

Figure 9:
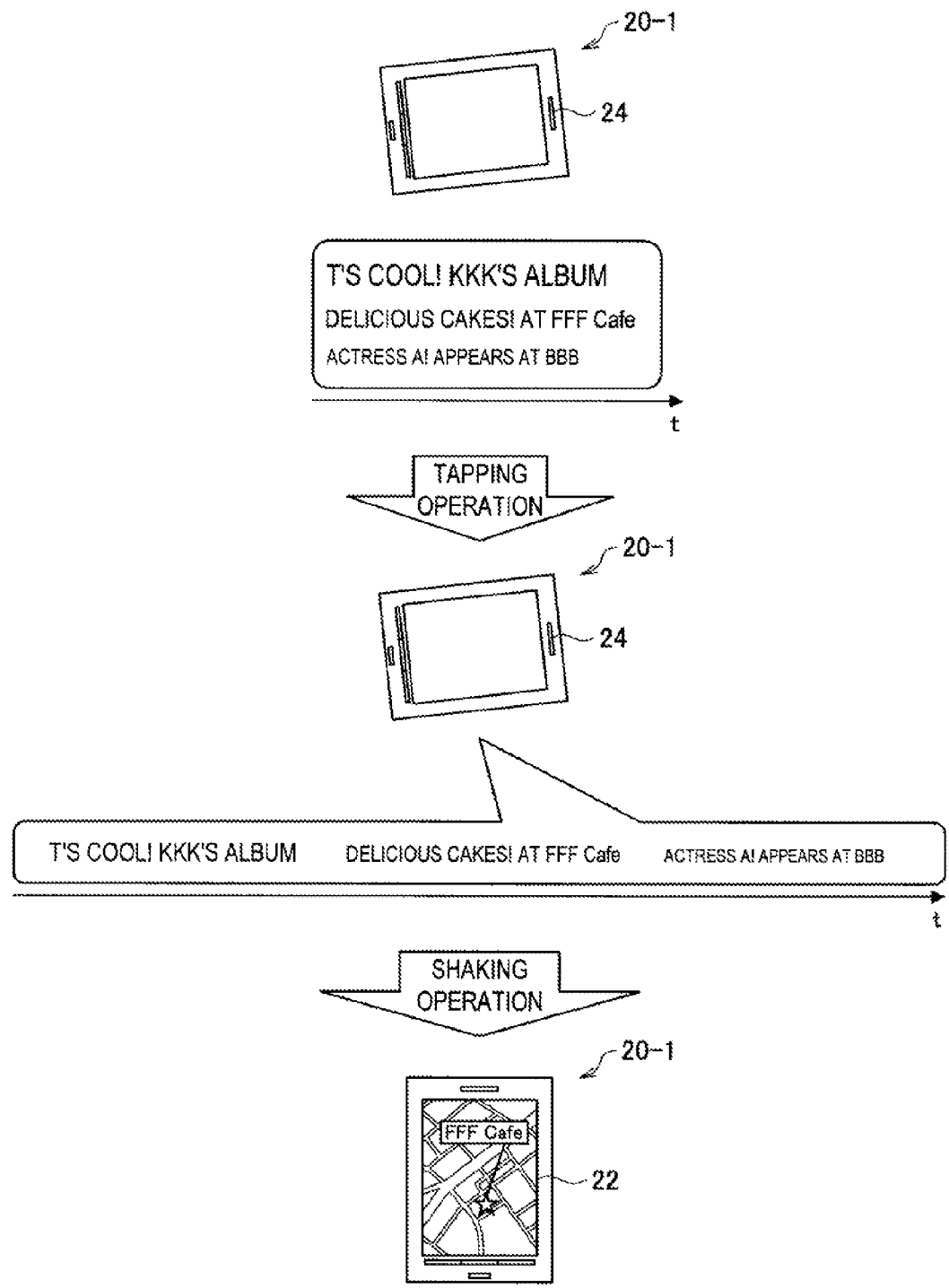
FIG. 9 illustrates a specific example of voice control through a voice control section.

FIG. 9 illustrates a specific example of the voice control by the voice control section 240. When the user makes a tapping operation while plural pieces of tag information are being simultaneously output as shown in FIG. 9, the voice control section 240 switches the voice control mode in which plural pieces of tag information are output in series. The voice control section 240 may perform the voice control so that plural pieces of tag information are output from plural pieces of tag information each associated with a position closer to the mobile terminal 20-1 in series. The size of the characters corresponds to the volume level as shown in FIG. 9.

Then, while a piece of desired tag information is being output with voice, when a shaking operation is made to shake the mobile terminal 20-1, the desired tag information is select. For example, when the user makes a shaking operation while the tag information TB is being output, the display control section 244 displays the position associated with the tag information TB on the touch panel 22.

As described above, the user selects a group which includes a piece of favorite tag information based on the cocktail-party effect, and then specifies the favorite tag information from the group to thereby obtain detailed information of the favorite tag information.

Display Control Section

The display control section 244 generates various display screens and displays the generated display screen on the touch panel 22. Particularly, in the second mode in which plural pieces of tag information are output in series, when an operation like shaking operation is made by the user, the display control section 244 according to the embodiment controls the display of a position associated with the tag information output with voice when the shaking operation is made (FIG. 9).

Figure 10:
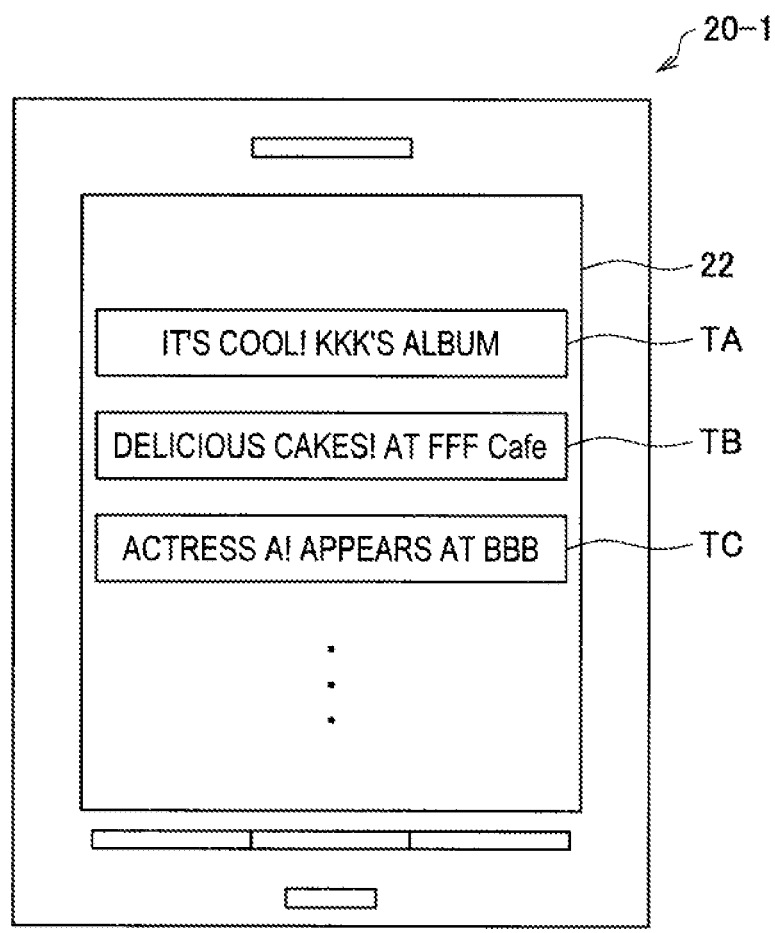
FIG. 10 illustrates a specific example of a list of tag information.

The above description has been made on the second mode in which plural pieces of tag information are output in series as the method for allowing the user to select a piece of favorite tag information from a group of plural pieces of tag information. However, the method to allow the user to select favorite tag information from a group is not limited to the above. For example, when a predetermined user operation is made in the first mode, in which plural pieces of tag information are simultaneously output, the display control section 244 may fix the plural pieces of tag information at a point when the user operation is made and display a list of the fixed plural pieces of tag information on the touch panel 22 as shown in FIG. 10. This configuration enables the user to select desired tag information from the list of plural pieces of tag information.

2-3. Operation of Mobile Terminal According to the First Embodiment

The configuration of the mobile terminal 20-1 according to the first embodiment of the present disclosure has been described above. Now, referring to FIG. 11, operation of the mobile terminal 20-1 according to the first embodiment of the present disclosure will be described below.

Figure 11:
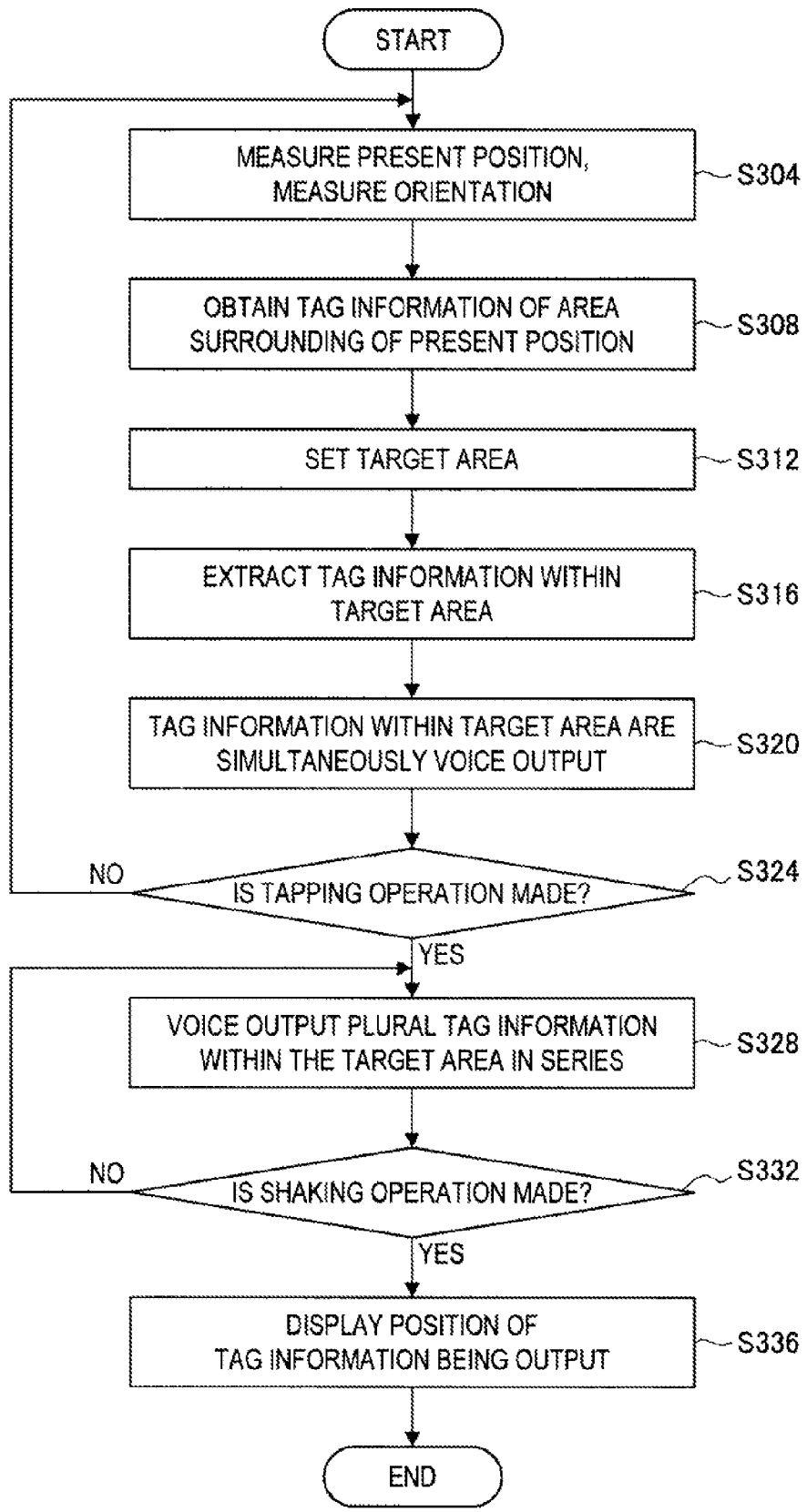
FIG. 11 is a flowchart showing the operation of the mobile terminal according to the first embodiment of the present disclosure.

FIG. 11 is a flowchart showing the operation of the mobile terminal 20-1 according to the first embodiment of the present disclosure. As shown in FIG. 11, the GPS 220 of the mobile terminal 20-1 measures the present position of the mobile terminal 20-1, and the acceleration sensor 224 measures the orientation of the lower side LS of the mobile terminal 20-1 (S304). Then, the communication section 228 transmits a piece of positional information of the mobile terminal 20-1 to the AR server 10 to thereby obtain a piece of tag information associated with the area surrounding the mobile terminal 20-1 from the AR server 10 (S308). In addition, the direction sensor may measure the direction in which the mobile terminal 20-1 is pointing, and the measured direction may be included in the positional information.

On the other hand, the area setting section 234 sets a target area with respect to the voice output of a the tag information based on the positional information of the mobile terminal 20-1 and either one or both of the measurement result obtained by the acceleration sensor 224 and the measurement result obtained from the direction sensor. After that, the information analysis section 236 extracts a piece of tag information within the target area from the tag information associated with the area surrounding the mobile terminal 20-1 (S316). The voice control section 240 performs the voice control so that plural pieces of tag information within the target area are simultaneously output from the speaker 24 (S320).

After that, when the user makes a tapping operation on the touch panel 22 (S324), the voice control section 240 switches the voice control mode so that plural pieces of tag information within the target area are output in series (S328). When a shaking operation is made by the user (S332), the display control section 244 displays on the touch panel 22 a display screen representing a position associated with the tag information being output with voice when the shaking operation is made (S336).

As described above, according the first embodiment of the present disclosure, by simultaneously outputting the plural pieces of tag information, the user can select a group including his/her favorite tag information based on the cocktail-party effect.

3. Second Embodiment

Subsequently, the second embodiment of the present disclosure will be described below. The second embodiment of the present disclosure is different from the first embodiment in a point that the voice output is made not through the speaker 24 but through a wearable voice output unit. The second embodiment of the present disclosure will be described in detail below.

FIG. 12 illustrates a mobile terminal 20-2 according to the second embodiment and a voice output unit 30 according to the present disclosure. As shown in FIG. 12, the mobile terminal 20-2 according to the second embodiment transmits voice signals to the voice output unit 30, and the voice output unit 30 outputs the voice signals received from the mobile terminal 20-2 with stereo sounds.

FIG. 12 illustrates an example in which the mobile terminal 20-2 and the voice output unit 30 are connected to each other via near field communication. However, the mobile terminal 20-2 and the voice output unit 30 may be connected to each other via a wire. FIG. 12 illustrates a headphone as an example of the wearable voice output unit 30. However, the voice output unit 30 is not limited to a headphone but may be earphones, for example.

Configuration of Mobile Terminal According to the Second Embodiment

Figure 13:
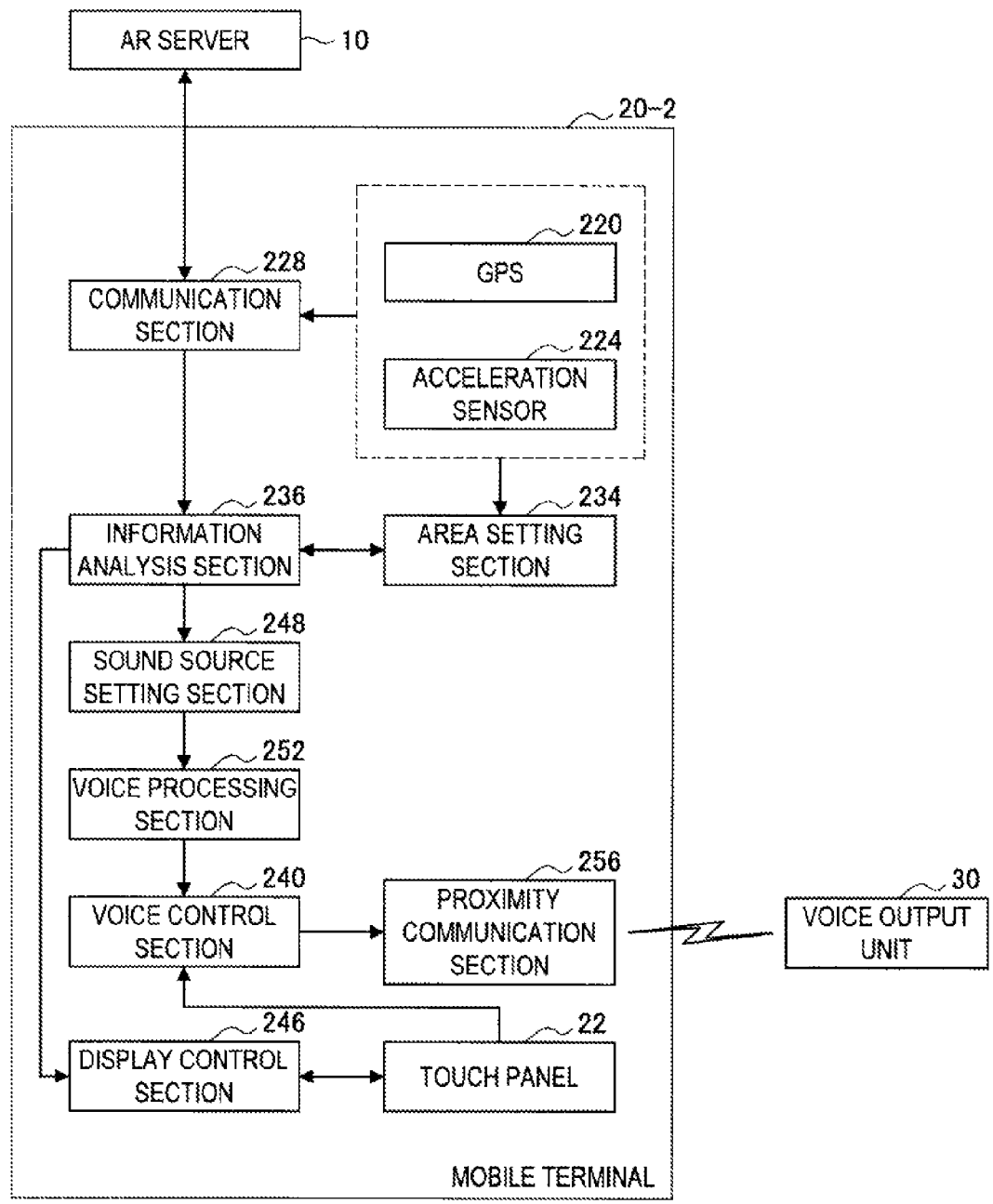
FIG. 13 is a functional block diagram showing a configuration of a mobile terminal according to the second embodiment.

Subsequently, referring to FIG. 13, configuration of the mobile terminal 20-2 according to the second embodiment will be described below. FIG. 13 is a functional block diagram showing a configuration of the mobile terminal 20-2 according to the second embodiment. As shown in FIG. 13, the mobile terminal 20-2 according to the second embodiment includes the touch panel 22, the GPS 220, the acceleration sensor 224, the communication section 228, the area setting section 234, the information analysis section 236, the voice control section 240, the display control section 246, a sound source setting section 248, a voice processing section 252 and a proximity communication section 256. Since the configuration of the touch panel 22, the GPS 220, the acceleration sensor 224, the communication section 228 and the voice control section 240 is substantially identical to those of the first embodiment, detailed description thereof is omitted here. The mobile terminal 20-2 may include a direction sensor (not shown), such as an electronic compass. The direction sensor may be included in addition to the acceleration sensor 224, or as an alternative to the acceleration sensor 224.

The area setting section 234 sets a target area with respect to the voice output of the tag information based on the positional information of the mobile terminal 20-1 supplied from the GPS 220 and either one or both of the measurement result obtained by the acceleration sensor 224 and the measurement result obtained from the direction sensor. Here, different from the first embodiment, the user does not have to hold the speaker 24 over the ear, the area setting section 234 sets the target area using a direction in which, not the lower side LS but the upper side US, for example, of the mobile terminal 20-2 is oriented as a reference.

The sound source setting section 248 sets a virtual sound source position for each of plural pieces of tag information extracted by the information analysis section 236. For example, the sound source setting section 248 may set positions each associated with plural pieces of tag information at the respective virtual sound source positions. The sound source setting section 248 may set positions different from the positions associated with plural pieces of tag information as virtual sound source positions for the plural pieces of tag information. Thus, by setting virtual sound source positions different from each other to the plural pieces of tag information, it is expected that the cocktail-party effect is enhanced.

The voice processing section 252 performs voice processing on each plural pieces of tag information so that virtual sound source positions set by the sound source setting section 248 are apprehended by the user as sound source positions. This processing is performed in accordance with the orientation of the user. Therefore, the user may wear a sensor for detecting user's orientation, or the orientation of the upper side US of the mobile terminal 20-2 may be handled as the orientation of the user.

The proximity communication section 256 transmits the voice signals processed by the voice processing section 252 to the voice output unit 30. The voice output unit 30 outputs the voice signals received from the proximity communication section 256 with stereo sounds.

Figure 14:
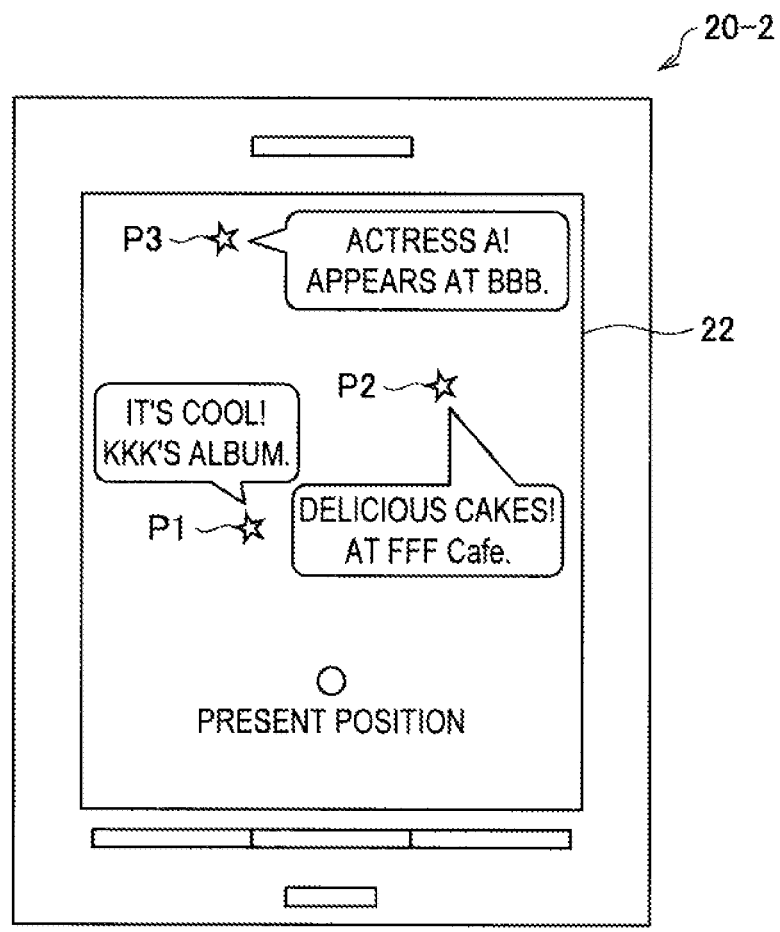
FIG. 14 illustrates an example of display according to the second embodiment.

The display control section 246 displays plural pieces of tag information on the touch panel 22 while plural pieces of tag information are being output simultaneously from the voice output unit 30. Here, the display control section 246 may perform display control so that the plural pieces of tag information are displayed at each of the virtual sound source positions with respect to the present position as the reference which are set by the sound source setting section 248 as shown in FIG. 14. This configuration allows the user also to apprehend visually the positions of the plural pieces of tag information, which is apprehended by hearing.

4. Hardware Configuration of Mobile Terminal

Embodiments of the present disclosure have been described in detail. Above-described information processing by the mobile terminal 20 according to the embodiments of the present disclosure is achieved by collaboration between the software and the hardware of the mobile terminal 20. The hardware configuration of the mobile terminal 20 will be described below referring to FIG. 15.

Figure 15:
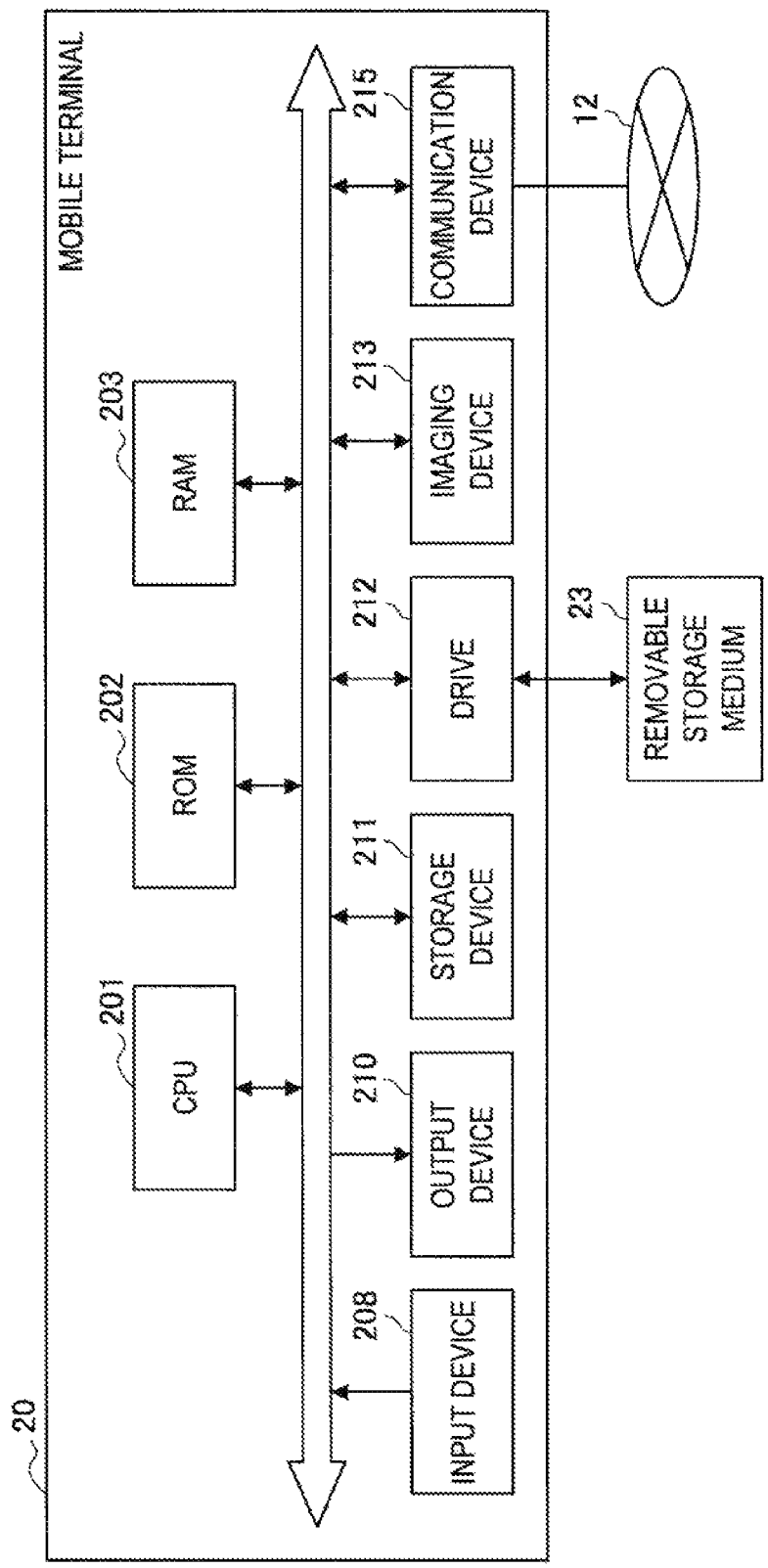
FIG. 15 illustrates a hardware configuration of a mobile terminal.

FIG. 15 is an explanatory view showing the hardware configuration of the mobile terminal 20. As shown in FIG. 15, the mobile terminal 20 includes a central processing unit (CPU) 201, a read only memory (ROM) 202, a random access memory (RAM) 203, an input apparatus 208, an output apparatus 210, a storage apparatus 211, a drive 212, an imaging apparatus 213, and a communication apparatus 215.

The CPU 201 functions as an arithmetic processing unit and control apparatus and controls overall operations of the mobile terminal 20 according to various programs. The CPU 201 may also be a microprocessor. The ROM 202 stores programs and operation parameters used by the CPU 201. The RAM 203 temporarily stores a program used for execution of the CPU 201 and parameters that suitably change during execution thereof. These elements are mutually connected by a host bus constructed from a CPU bus or the like.

The input apparatus 208 includes an input unit used by the user to input information such as a mouse, keyboard, touch panel, button, microphone, switch, and lever and an input control circuit that generates an input signal based on input from the user and outputs the input signal to the CPU 201. The user of the mobile terminal 20 can input various kinds of data into the mobile terminal 20 or instruct the mobile terminal 20 to perform a processing operation by operating the input apparatus 208.

The output apparatus 210 includes, for example, a display apparatus such as a liquid crystal display (LCD) apparatus, organic light emitting diode (OLED) apparatus, and lamp. Further, the output apparatus 210 includes a sound output apparatus such as a speaker and headphone. For example, the display apparatus displays captured images or generated images. On the other hand, the sound output apparatus converts sound data or the like into sound and outputs the sound.

The storage apparatus 211 is an apparatus for data storage configured as an example of a storage unit of the mobile terminal 20 according to the present embodiment. The storage apparatus 211 may contain a storage medium, a recording apparatus that records data in the storage medium, a reading apparatus that reads data from the storage medium, or a deletion apparatus that deletes data recorded in the storage medium. The storage apparatus 211 stores programs executed by the CPU 201 and various kinds of data.

The drive 212 is a reader/writer for a storage medium and is attached to the mobile terminal 20 internally or externally. The drive 212 reads information stored in a removable storage medium 23 such as an inserted magnetic disk, optical disk, magneto-optical disk, and semiconductor memory and outputs the information to the RAM 203. The drive 212 can also write data into the removable storage medium 23.

The imaging apparatus 213 includes an imaging optical system such as a shooting lens that condenses light and a zoom lens and a signal conversion element such as a charge coupled device (CCD) and complementary metal oxide semiconductor (CMOS). The imaging optical system condenses light emitted from a subject to form a subject image in a signal conversion unit and the signal conversion element converts the formed subject image into an electric image signal.

The communication device 215 is a communication interface constituted with a communication device and the like to be connected to a communication network 12, for example. Here, the communication device 215 may be a wireless local area network (LAN) compatible communication device, a LTE (Long Term Evolution) compatible communication device or a wired communication device to perform communication with a cable.

5. Conclusion

As described above, according to the embodiments of the present disclosure, by simultaneously outputting plural pieces of tag information, the user can swiftly select a group including his/her favorite tag information base on the cocktail-party effect. After that, the user specifies his/her favorite tag information from the group visually or by hearing to thereby obtain detailed information of the favorite tag information.

Also, according to the present disclosure, in the case the tag information is a piece of information provide by an ordinary user while associating the same with the present position, the user can apprehend a sense of distance from the ordinary user based on the volume level of the output tag information. Moreover by applying the tag information of the present disclosure to a mail or chat associated with the positional information of the other party, it is possible for the use to apprehend a direction and distance of the other party.

Preferred embodiments of the present disclosure have been described above in detail while referring to appended drawings. However, the technical range of the present disclosure is not limited to the above-described examples. It is clear that those skilled in the art of the present disclosure can easily conceive various modifications and corrections within a range of the technical sprit disclosed in claims. It should be accordingly understood that such modifications and corrections belong to the technical range of the present disclosure.

For example, the steps of the processing of the mobile terminal 20 in this specification may not be processed in time series described in the flowchart. For example, the steps in the processing of the mobile terminal 20 may be processed in an order different from the order described in the flowchart, or may be processed parallelly.

Moreover, it is possible to create a computer program that causes the hardware mounted in the mobile terminal 20 including CPU 201, the ROM 202 and the RAM 203 or the like to function same as the above-described configurations of the mobile terminal 20. A recording media storing the computer program is also provided.

Additionally, the present technology may also be configured as below.
(1) An information processing apparatus including: a communication device to receive plural pieces of tag information corresponding to respective positions within a target area, the target area having a position defined by the position of the apparatus; and an output device to output a plurality of sounds such that for each sound at least a portion of the sound overlaps with at least a portion of another of the sounds, each of the sounds being indicative of a respective piece of tag information.
(2) The apparatus according to (1), wherein the sounds are voice sounds.
(3) The apparatus according to (1), wherein each piece of tag information is associated with a direction relative to the apparatus.
(4) The apparatus according to (1), wherein each of the sounds has an associated sound characteristic, and the associated sound characteristic for any one of the sounds is different from the associated sound characteristic for any other of the sounds.
(5) The apparatus according to (4), wherein the associated sound characteristic is volume.
(6) The apparatus according to (4), wherein the associated sound characteristic is frequency.
(7) The apparatus according to (4), wherein the associated sound characteristic is virtual sound source position.
(8) The apparatus according to (1), wherein the sounds are voice sounds and include at least one keyword for each piece of tag information, and wherein output of the sounds is performed such that no two of the keywords are output simultaneously.
(9) The apparatus according to (1), wherein the sounds are output in the form of stereophonic sound.
(10) The apparatus according to (1), wherein the size of the target area is determined according to the density of the positions of the pieces of tag information.
(11) The apparatus according to (1), wherein the sounds are generated based on the respective pieces of tag information.
(12) The apparatus according to (11), wherein the sounds are voice sounds and are generated to include a user-preferred word as a first word.
(13) The apparatus according to (1), further including a touch panel display, wherein when the apparatus is outputting the plurality of sounds simultaneously and a user operation is performed during the outputting, a list indicative of the pieces of tag information associated with the sounds is displayed on the touch panel display.
(14) The apparatus according to (1), wherein when the apparatus is outputting the plurality of sounds simultaneously and a user operation is performed during the outputting, the apparatus outputs the plurality of sounds in series.
(15) The apparatus according to (14), wherein the user operation comprises tapping the apparatus.
(16) The apparatus according to (1), further including a display, wherein when the apparatus is outputting the plurality of sounds simultaneously indicators of the respective pieces of tag information are displayed on the display, the indicators being displayed at virtual sound source positions relative to the position of the apparatus.
(17) An information processing apparatus including: a database of plural pieces of tag information corresponding to respective positions within a target area, the target area having a position defined by the position of the apparatus; and an output device to output a plurality of sounds such that for each sound at least a portion of the sound overlaps with at least a portion of another of the sounds, each of the sounds being indicative of a respective piece of tag information.
(18) The apparatus according to (17), wherein each piece of tag information is associated with a direction relative to the apparatus.
(19) The apparatus according to (17), wherein each of the sounds has an associated sound characteristic, and the associated sound characteristic for any one of the sounds is different from the associated sound characteristic for any other of the sounds.

(20) An information processing method including: receiving plural pieces of tag information corresponding to respective positions within a target area, the target area having a position defined by the position of an apparatus; and outputting a plurality of sounds such that for each sound at least a portion of the sound overlaps with at least a portion of another of the sounds, each of the sounds being indicative of a respective piece of tag information.

(21) A non-transitory computer-readable medium having stored thereon a computer-readable program for implementing an information processing method, the method including: receiving plural pieces of tag information corresponding to respective positions within a target area, the target area having a position defined by the position of an apparatus; and outputting a plurality of sounds such that for each sound at least a portion of the sound overlaps with at least a portion of another of the sounds, each of the sounds being indicative of a respective piece of tag information.

REFERENCE SIGNS LIST

10 AR server
20 mobile terminal
22 touch panel
24 speaker
26 microphone
30 voice output unit
220 GPS
224 acceleration sensor
228 communication section
232, 234 area setting section
236 information analysis section
240 voice control section
244, 246 display control section
248 sound source setting section
252 voice processing section
256 proximity communication section

The invention claimed is:

1. A non-transitory computer readable-medium configured to store a computer-readable program, in which the program is for processing information at a mobile terminal connectable to a server by way of a communication network, the program comprising:
receiving from the server by way of the communication network plural pieces of tag information corresponding to respective positions within a target area;
outputting a plurality of sounds such that for each sound at least a portion of the sound overlaps with at least a portion of another of the sounds, each of the sounds being indicative of a respective piece of tag information; and
controlling displaying, on a map on a display, a position relationship among a current position and any one of the positions respectively of the pieces of tag information.

2. A mobile terminal connectable to a server by way of a communication network, said mobile terminal comprising:
a communication device to receive from the server by way of the communication network plural pieces of tag information corresponding to respective positions within a target area;
a speaker to output a plurality of sounds such that for each sound at least a portion of the sound overlaps with at least a portion of another of the sounds, each of the sounds being indicative of a respective piece of tag information; and
a display control section configured to control displaying, on a map on a display, a position relationship among a current position and any one of the positions respectively of the pieces of tag information.

3. The mobile terminal of claim 2, wherein one keyword for each piece of tag information is displayed in association with the position of the piece of tag information.

4. The mobile terminal of claim 2, wherein the target area has a position defined by a position of the mobile terminal.

5. The mobile terminal of claim 2, wherein the sounds are output in a form of stereophonic sound.

6. The mobile terminal of claim 2,
wherein the display is a touch panel display, and
wherein when the speaker is outputting the plurality of sounds simultaneously and a user operation is performed during the outputting, a list indicative of the pieces of tag information associated with the sounds is displayed on the touch panel display.

7. The mobile terminal of claim 6, wherein the user operation comprises tapping the mobile terminal.

8. The mobile terminal of claim 2, wherein when the speaker is outputting the plurality of sounds simultaneously and a user operation is performed during the outputting, the plurality of sounds is output in series.

9. The mobile terminal of claim 8, wherein the user operation comprises tapping the mobile terminal.

10. The mobile terminal of claim 2,
wherein when the speaker is outputting the plurality of sounds simultaneously indicators respectively of the pieces of tag information are displayed on the display, the indicators being displayed at respective virtual sound source positions relative to a position of the mobile terminal.

11. The mobile terminal of claim 2, wherein the sounds are output at respective virtual sound source positions in accordance with an orientation of a user of the mobile terminal.

12. The mobile terminal of claim 11, wherein an orientation of a predetermined side of the mobile terminal is the orientation of the user.

13. The mobile terminal of claim 11, wherein the orientation of the user is based on detection by a sensor coupled to the user.

14. The mobile terminal of claim 2, wherein the sounds are output to include a user preferred word as a first word.

15. The mobile terminal of claim 2, wherein the sounds are voice sounds.

16. The mobile terminal of claim 2, wherein the sounds include at least one keyword for each piece of tag information.

17. A mobile terminal comprising:
a storage device having a database of plural pieces of tag information corresponding to respective positions within a target area;
an audio output device to output a plurality of sounds such that for each sound at least a portion of the sound overlaps with at least a portion of another of the sounds, each of the sounds being indicative of a respective piece of tag information,
wherein each of the sounds has an associated sound characteristic, and the associated sound characteristic for any one of the sounds is different from the associated sound characteristic for any other of the sounds; and a display control section configured to control displaying, on a display, a position relationship among a current position and any one of the positions respectively of the pieces of tag information.

18. A method of processing information at a mobile terminal connectable to a server by way of a communication network, the method comprising:

receiving from the server by way of the communication network plural pieces of tag information corresponding to respective positions within a target area;

outputting a plurality of sounds such that for each sound at least a portion of the sound overlaps with at least a portion of another of the sounds, each of the sounds being indicative of a respective piece of tag information; and controlling displaying, on a map on a display, a position relationship among a current position and any one of the positions respectively of the pieces of tag information.

* * * * *